Aug. 4, 1959   G. E. HAVEMEYER   2,898,443
TRACING WELD METAL
Filed July 1, 1955

INVENTOR.
George E. Havemeyer
BY
Clyde H. Haynes
his attorney

2,898,443
TRACING WELD METAL

George E. Havemeyer, Guilford, Conn., assignor to Gregory Industries, Inc., Detroit, Mich., a corporation of Michigan Application July 1, 1955, Serial No. 519,393

1 Claim. (Cl. 219—99)

This invention relates to the method of tracing the penetration of stud material into the plate material during stud arc welding. In stud welding as commonly used commercially, a small quantity of flux material is placed at the end of the stud to aid in the welding. This flux material is usually aluminum or contains aluminum or is a metal which will readily and completely burn out during the welding process. When this metal burns out, the only material left is the steel from the stud and the plate or the alloys of that steel formed during the welding. It is extremely difficult to determine the penetration of the stud material into the plate when there are only the alloys of steel to work with. Although the penetration can be checked in the laboratory, such checking is not practical in production.

One of the uses of the studs is as a tong hold on forgings. The stud is placed on the forging billet and used as a handle during the forging process after which the stud is broken from the billet or forged piece. In certain instances it is very important that no metal from the stud appear in the forging after the stud has been broken away. On such a product the method of determining whether or not any of the stud remains on the forging or determining the depth of penetration of the stud material must be adaptable to production line practices.

Therefore, one of the objects is to provide a method of welding studs to forgings for use as tong holds, then determining the presence of any stud material in the forging after the stud has been removed.

Another object of the invention is to provide a method of determining the penetration of stud material into plate material during the welding of the stud to the plate wherein the method is economical, easy to use and can be readily adapted to production lines.

Figure 1:
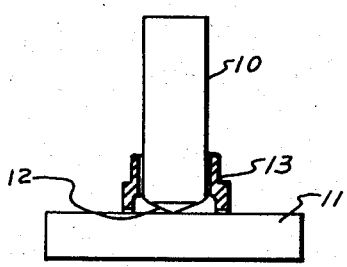
Figure 2:
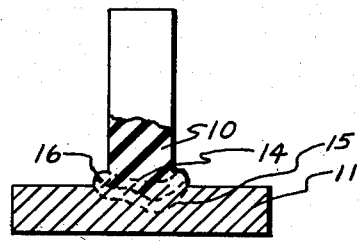
Figure 3:
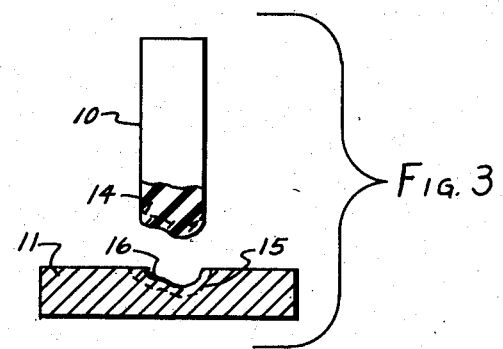
Figure 4:
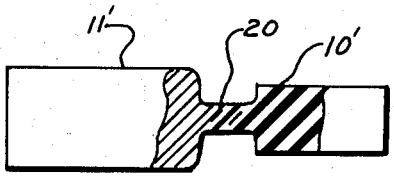
Figure 5:
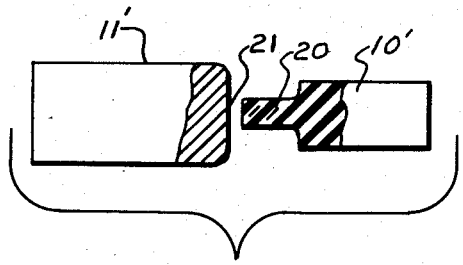

Other objects and a full understanding of the invention will become apparent from the description and claim and the drawings in which:

Figure 1 is a plan view of a stud positioned ready for welding to a plate; Figure 2 is a sectional view of a stud welded to the plate; Figure 3 is an enlarged sectional view of a stud broken from the plate; Figure 4 is a plan view partially in section of a forging billet showing the portion of the stud and billet flashing; and Figure 5 is a view of the billet of Figure 4 after the flash has been cut.

The first step in performing the method of tracing the penetration of stud material into plate material is to position the stud 10 in welding position against the plate 11. The stud 10 may be constructed similar to the one illustrated in Nelson Patent No. 2,402,659, issued June 25, 1946, and is provided with flux and a cap 12 which holds the flux in the end of the stud. However, in the present instance the cap 12 contains sufficient material other than the material of the stud or plate so that it will be completely melted, but not completely burned away or destroyed during the period of the arc. The stud 10 is welded to the plate 11 by an arc therebetween and within the ferrule 13 which surrounds the stud 10 as is more fully disclosed in Nelson Patent No. Re. 22,411, reissued December 21, 1943.

After the stud has been welded to the plate, a structure as illustrated in Figure 2, is obtained. In Figure 2 the dotted line 14 indicates the boundary of the heat affected zone in the stud and the dotted line 15 indicates the heat affected zone boundry in the plate. These heat affected zones are composed of material from the stud and plate which were heated to a temperature above the critical temperature of the stud and plate, but below the melting temperature; for example, with the stud and plate a ferrous material, the heat affected zone would be raised to a temperature of 2000 degrees or more above the critical temperature and below the melting temperature of the parent metal. Between these heat affected zones 14 and 15 lies a fillet or weld metal zone 16 which contains the metal melted by the arc during the welding process. This metal contains that portion of the tracer cap which was not destroyed by the welding.

After the stud is broken or otherwise removed from the plate as illustrated in Figure 3, a portion of this weld zone 16 remains on the end of the stud. The presence of any of the non-destroyed material of the cap still remaining in the plate can be determined quickly and easily by etching the plate at the site of the weld.

In actual production the cap is a different material than the stud or plate and an etching solution is used which will turn the material of the cap a different color than the material of the plate or stud. For example, if copper is used in the cap on a steel stud, an etching acid can be used for etching. The acid will turn the copper or an alloy containing copper much darker than the steel, thus providing a visible indication of the depth of penetration or the presence of stud material in the plate.

As a specific example of the use of this product, refer to Figures 4 and 5. Figure 4 illustrates a forging after the forging operation has been completed and before the flash 20 is trimmed. The stud $10^1$ is on the flash 20 on the side of the forging $11^1$. As is illustrated in cross section, the weld metal from the stud is intermixed with and in the flash 20, having been drawn there during the forging operation. Generally the stud is of a different alloy or a different material than the forging. Thus, it is necessary that none of the stud material remains in the completed forging.

In the next step of the forging operation the flash 20 and stud $10^1$ is sheared, cut or trimmed from the main body of the forging $11^1$. This is illustrated in Figure 5 which shows the flash and stud as a separate part from the forging $11^1$. In actual production the forging is next passed through a pickling bath which contains a chemical capable of coloring any of the material or alloys containing material of the tracer cap of the stud a different color than the color of the forging $11^1$. Thus when the forging $11^1$ is removed from the pickling bath, visual inspection of the surface 21 will show whether or not any of the stud material remains in the forging. If all of the stud material, including the tracer cap and alloys thereof, are contained in the flash, there will not be a visual colored spot on surface 21. However, if any of the tracer cap material, including alloys, have penetrated into the forging $11^1$ a spot will be visible on the surface 21. Presence of a spot on the surface 21 is an indication of the presence of stud material in the forging $11^1$. This method can be used by the average employee on a production line whereas prior methods not using a tracer cap required the penetration to be checked by laboratory equipment.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claim which is made a part hereof.

The embodiments of the invention in which an exclusive property or privilege is claimed are defined as follows:

The method of forging with a minimum of forging stock, comprising the steps of selecting a billet of forging stock, selecting a grip stud, welding said grip stud to said billet, and simultaneously with the welding of said grip stud introducing an alloying material having a contrasting chemical etch reaction when alloyed in said billet as compared to the billet stock, thereafter forging said billet to produce a forged member and excess flash, trimming said flash, and finally etching the forged material to determine the extent and location of contrasting etch and thereby determining whether the said alloying material has been fully removed.

References Cited in the file of this patent

UNITED STATES PATENTS

| | | |
|---|---|---|
| 2,499,577 | Fine | Mar. 7, 1950 |
| 2,506,747 | Smith | May 9, 1950 |

OTHER REFERENCES

Welding Handbook, 3rd edition, 1950, published by American Welding Society, pp. 950 and 956–957.